United States Patent
Kaneko et al.

(10) Patent No.: US 7,945,379 B2
(45) Date of Patent: May 17, 2011

(54) KNOCK DETERMINATION DEVICE AND METHOD FOR INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Norihito Hanai, Toyota (JP); Yuuichi Takemura, Anjo (JP); Shuhei Oe, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 213 days.

(21) Appl. No.: 12/303,123

(22) PCT Filed: Jun. 5, 2007

(86) PCT No.: PCT/JP2007/061691
§ 371 (c)(1),
(2), (4) Date: Dec. 2, 2008

(87) PCT Pub. No.: WO2007/142348
PCT Pub. Date: Dec. 13, 2007

(65) Prior Publication Data
US 2009/0150058 A1 Jun. 11, 2009

(30) Foreign Application Priority Data
Jun. 6, 2006 (JP) .................. 2006-157612

(51) Int. Cl.
*G06F 19/00* (2006.01)
(52) U.S. Cl. .................. 701/111; 123/406.34; 73/35.01; 73/35.03

(58) Field of Classification Search .................. 701/111, 701/114, 115; 123/406.29, 406.34, 406.38, 123/406.39; 73/35.01, 35.03, 35.06, 35.09
See application file for complete search history.

(56) References Cited

U.S. PATENT DOCUMENTS

| | | | |
|---|---|---|---|
| 4,344,318 A | 8/1982 | Dudeck et al. | |
| 6,665,622 B1 | 12/2003 | Chappell et al. | |
| 7,412,874 B2 * | 8/2008 | Oe et al. | 73/35.09 |
| 2004/0204814 A1 | 10/2004 | Honda | |
| 2005/0000272 A1 | 1/2005 | Takemura et al. | |
| 2005/0234633 A1 | 10/2005 | Takemura et al. | |
| 2005/0251320 A1 | 11/2005 | Kasashima et al. | |
| 2006/0185422 A1 * | 8/2006 | Iwade et al. | 73/35.09 |
| 2007/0000307 A1 | 1/2007 | Yoshihara et al. | |

(Continued)

FOREIGN PATENT DOCUMENTS
DE 42 23 649 1/1993
(Continued)

*Primary Examiner* — John T Kwon
(74) *Attorney, Agent, or Firm* — Oblon, Spivak, McClelland, Maier & Neustadt, L.L.P.

(57) ABSTRACT

An engine ECU executes a program including the steps of: calculating a coefficient of correlation K in accordance with a result of comparing a waveform of a vibration of a frequency band including a resonance frequency of an engine with a knock waveform model previously created as a waveform of a vibration caused when the engine knocks; calculating a knock intensity N from an intensity of a vibration of a frequency band excluding the resonance frequency of the engine; if knock intensity N is larger than a reference value and coefficient of correlation K is larger than a threshold value, determining that the engine knocks; and if knock intensity N is smaller than the reference value and/or coefficient of correlation K is smaller than the threshold value, determining that the engine does not knock.

15 Claims, 10 Drawing Sheets

U.S. PATENT DOCUMENTS

2007/0012090 A1  1/2007  Yoshihara et al.

FOREIGN PATENT DOCUMENTS

| | | |
|---|---|---|
| EP | 1 586 882 | 10/2005 |
| JP | 2000-186609 | 7/2000 |
| JP | 2001 227400 | 8/2001 |
| JP | 2004-52614 | 2/2004 |
| JP | 2005 42583 | 2/2005 |
| JP | 2005-330954 | 12/2005 |
| WO | 2007 004451 | 1/2007 |

* cited by examiner

KNOCK DETERMINATION DEVICE AND METHOD FOR INTERNAL COMBUSTION ENGINE

TECHNICAL FIELD

The present invention relates to a knock determination device and method and particularly to a technique for an internal combustion engine that determines from a waveform of a vibration of the internal combustion engine whether the engine knocks.

BACKGROUND ART

Conventionally techniques employed to detect whether an internal combustion engine knocks or not are known. Japanese Patent Laying-open No. 2001-227400 discloses a knock control device for an internal combustion engine that can accurately determine whether the engine knocks. The knock control device described in Japanese Patent Laying-open No. 2001-227400 includes a signal detection unit detecting a vibration waveform signal generated in the internal combustion engine, a generation period detection unit detecting as a generation period a period for which the vibration waveform signal detected by the signal detection unit has at least a predetermined value, a peak position detection unit detecting a peak position in the generation period detected by the generation period detection unit, a knock determination unit determining from a relationship between the generation period and the peak position whether the internal combustion engine knocks, and a knock control unit controlling the internal combustion engine's operation state in accordance with a decision made by the knock determination unit. The knock determination unit determines that the engine knocks when the peak position relative to the generation period falls within a predetermined range. The signal detection unit detects a predetermined frequency component unique to a knock signal as the vibration waveform signal.

In the knock control device for an internal combustion engine, as described in this publication, a vibration waveform signal generated in the internal combustion engine is detected by a signal detection unit and a generation period, for which the vibration waveform signal has at least a predetermined value and its peak position are detected by a generation period detection unit and a peak position detection unit, respectively. It is thus found at which position in the generation period of the vibration waveform signal a peak is attained, and therefrom, whether the internal combustion engine knocks is determined by the knock determination unit and in accordance with such decision the internal combustion engine's operation state is controlled. When the peak position relative to the generation period falls within a predetermined range, i.e., if a waveform has a form having a peak position appearing earlier in the generation period of the vibration waveform signal that has a predetermined length, it is recognized as a waveform provided uniquely when the engine knocks. Whether the internal combustion engine knocks can thus also accurately be determined when the internal combustion engine's operation state rapidly changes, such as in transition, in turning on/off an electrical load, and the like. The internal combustion engine's operation state can thus be controlled appropriately.

The knock control device for an internal combustion engine as described in Japanese Patent Laying-open No. 2001-227400 allows a frequency component unique to knocking to be detected as a vibration waveform signal. However, such adaptation that allows the frequency component unique to knocking to be detected removes a noise component corresponding to a vibration component that is not attributed to knocking and as a result the noise component's characteristic portion (e.g., the timing of the occurrence of the vibration, the vibration's damping rate, and the like) is removed. As a result, if a vibration is attributed to noise, a waveform analogous to that of a vibration attributed to knocking can be obtained. In that case, it is difficult to distinguish the vibration attributed to knocking and that attributed to noise and whether the engine knocks cannot determined with precision. The knock control device for an internal combustion engine as described in Japanese Patent Laying-open No. 2001-227400, however, fails to provide any consideration to such issue.

DISCLOSURE OF THE INVENTION

The present invention contemplates a knock determination device and the like for an internal combustion engine, that can determine with precision whether the engine knocks.

The present invention in one aspect provides a knock determination device for an internal combustion engine, including: a knock sensor detecting a vibration of the internal combustion engine; and an operation unit operative to extract from the detected vibration a vibration of a first frequency band excluding a resonance frequency of the internal combustion engine, extract from the detected vibration a vibration of a second frequency band including the first frequency band and the resonance frequency of the internal combustion engine, detect a waveform of a vibration at predetermined crank angle intervals, as based on the vibration of the second frequency, store in advance a waveform serving as a reference in waveform for vibration of the internal combustion engine, and determine whether the internal combustion engine knocks, as based on a result of comparing the detected waveform with the stored waveform and an intensity of the vibration of the first frequency.

In accordance with this configuration a knock sensor detects vibration of an internal combustion engine. That vibration caused uniquely when the engine knocks is caused in a particular frequency band including a resonance frequency of the internal combustion engine. However, the vibration of the resonance frequency of the internal combustion engine can be caused both when the engine knocks and when it does not knock. Accordingly, a vibration of a first frequency band excluding the resonance frequency of the internal combustion engine is extracted from the vibration of the internal combustion engine. The vibration caused uniquely when the engine knocks, its magnitude in particular, can be extracted with precision. However, a noise component that can be included in the extracted vibration is removed and consequently the noise component's characteristic portion (e.g., the timing of the occurrence of the vibration, the vibration's damping rate, and the like) other than magnitude is removed. As a result, if a vibration is attributed to noise, a waveform analogous to that of a vibration attributed to knocking can be obtained. Thus it is difficult to distinguish the vibration attributed to knocking and that attributed to noise from each other. Accordingly, a vibration of a second frequency including the first frequency band and the resonance frequency of the internal combustion engine is extracted. In accordance with the vibration of the second frequency band, vibration is detected in waveform at predetermined crank angle intervals. This can provide a vibration waveform also incorporating the noise component's characteristic portion. Such waveform is compared with a waveform stored as a reference waveform of vibration (e.g., a waveform stored as that caused when the engine knocks), and whether the internal combustion engine knocks is determined from such comparison and the magnitude of the vibration of the first frequency band. Whether a vibration has a waveform and a magnitude that are provided uniquely when the engine knocks can thus be determined with precision. A knock determination device can thus be provided that can determine with precision whether an internal combustion engine knocks.

Preferably the first frequency band is a frequency band excluding the resonance frequency and in addition a frequency corresponding to the resonance frequency that is multiplied by an integer of at least two. The second frequency band is a frequency including the resonance frequency and in addition the frequency corresponding to the resonance frequency that is multiplied by the integer of at least two.

In this configuration whether the engine knocks is determined by using the magnitude of the vibration of the first frequency band that is a frequency band excluding the resonance frequency and in addition a frequency equal to the resonance frequency multiplied by an integer of at least two. This is because even if the engine does not knock, vibration can be caused at the frequency equal to the resonance frequency multiplied by the integer of at least two. The vibration of the first frequency band that excludes such frequency is extracted. That vibration caused uniquely when an engine knocks can thus be extracted with higher precision. Furthermore, whether the engine knocks is determined by using the waveform of the vibration of the second frequency band that is a frequency band including the resonance frequency and in addition the frequency equal to the resonance frequency multiplied by the integer of at least two. This can provide a vibration waveform incorporating a noise component's characteristic portion. Whether a detected vibration is that attributed to knocking or that attributed to noise can be determined with precision.

More preferably the integer of at least two is two.

In this configuration whether the engine knocks is determined by using the magnitude of the vibration of the first frequency band that is a frequency band excluding the resonance frequency and in addition a frequency equal to the resonance frequency multiplied by two. This is because even if the engine does not knock, vibration can be caused at the frequency equal to the resonance frequency multiplied by two. The vibration of the first frequency band that excludes such frequency is extracted. That vibration caused uniquely when an engine knocks can thus be extracted with higher precision. Furthermore, whether the engine knocks is determined by using the waveform of the vibration of the second frequency band that is a frequency band including the resonance frequency and in addition the frequency equal to the resonance frequency multiplied by two. This can provide a vibration waveform incorporating a noise component's characteristic portion. Whether a detected vibration is that attributed to knocking or that attributed to noise can be determined with precision.

BEST MODES FOR CARRYING OUT THE INVENTION

Hereinafter with reference to the drawings the present invention in embodiments will be described. In the following description, identical components are identically denoted. They are also identical in name and function. Therefore, their description will not be repeated.

Figure 1:
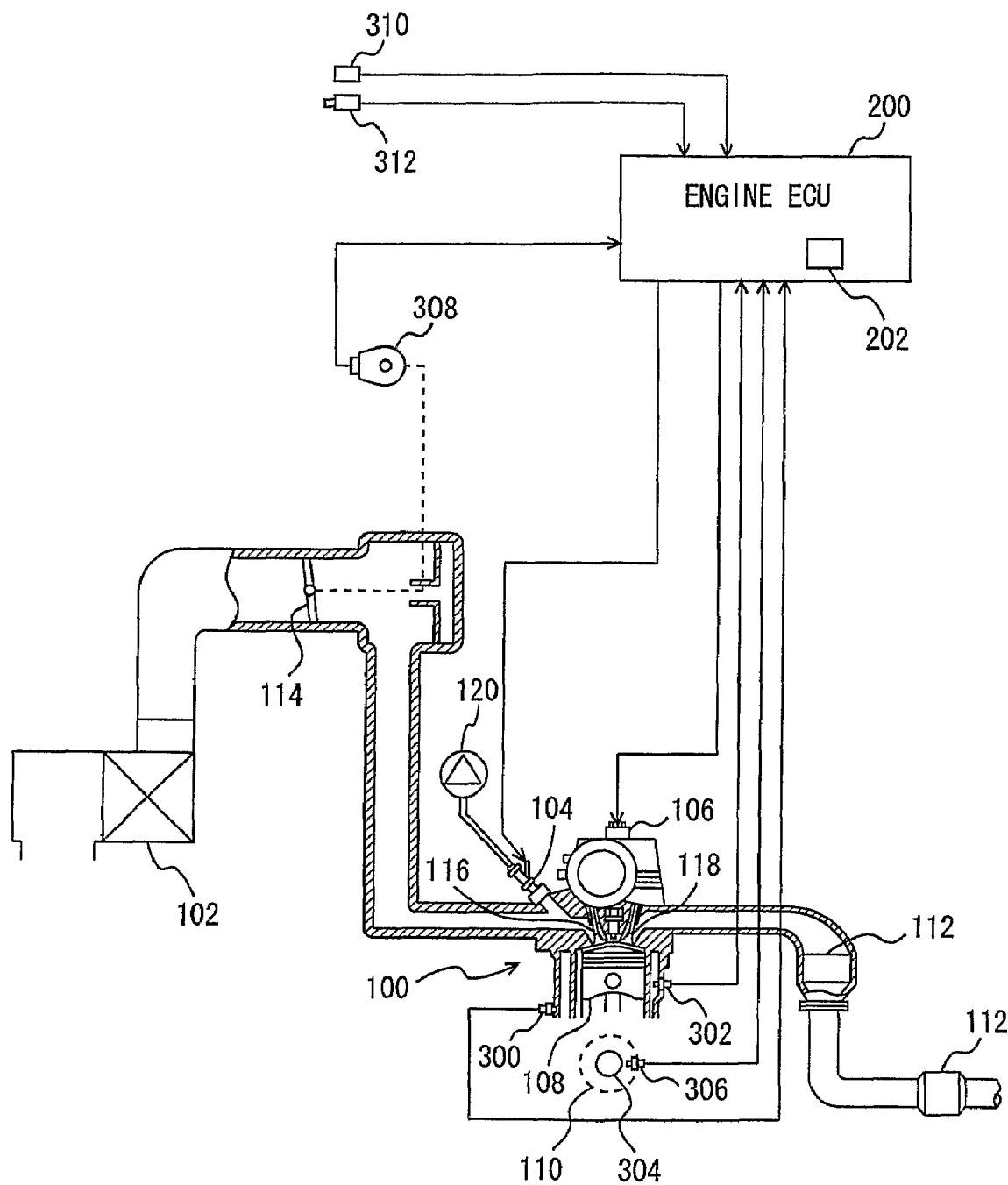
FIG. 1 is a schematic configuration diagram showing an engine of a vehicle having a knock determination device mounted therein according to an embodiment of the present invention.

With reference to FIG. 1, an engine 100 of a vehicle incorporating a knock determination device according to an embodiment of the present invention will be described. The knock determination device according to the present embodiment is implemented for example by a program executed by an engine ECU (electronic control unit) 200.

Engine 100 is an internal combustion engine that allows a mixture of air aspirated through an air cleaner 102 and a fuel injected by an injector 104 to be ignited in a combustion chamber by a spark plug 106 and thus combusted.

The air-fuel mixture combusted causes combustion pressure which presses a piston 108 down and a crank shaft 110 rotates. The combusted air-fuel mixture (or exhaust gas) is purified by a three-way catalyst 112 and thereafter discharged outside the vehicle. Engine 100 aspirates an amount of air adjusted by a throttle valve 114.

Engine 100 is controlled by engine ECU 200, which is connected thereto a knock sensor 300, a water temperature sensor 302, a crank position sensor 306 arranged opposite a timing rotor 304, a throttle angle sensor 308, a vehicle speed sensor 310, and an ignition switch 312.

Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of refrigerant water in engine 100 at a water jacket and transmits a signal representing a resultant detection to engine ECU 200.

Timing rotor 304 is provided at a crank shaft 110 and rotates as crank shaft 110 does. Timing rotor 304 is circumferentially provided with a plurality of protrusions spaced as predetermined. Crank position sensor 306 is arranged opposite the protrusions of timing rotor 304. When timing rotor 304 rotates, an air gap between the protrusions of timing rotor 304 and crank position sensor 306 varies, and a coil portion of crank position sensor 306 passes an increased/decreased magnetic flux and thus experiences electromotive force. Crank position sensor 306 transmits a signal representing the electromotive force to engine ECU 200. From the signal, engine ECU 200 detects a crank angle.

Throttle angle sensor 308 detects a throttle angle and transmits a signal representing a resultant detection to engine ECU 200. Vehicle speed sensor 310 detects a rate of rotation of a wheel (not shown) and transmits a signal representing a resultant detection to engine ECU 200. From the wheel's rate of rotation engine ECU 200 calculates the vehicle's speed. Ignition switch 312 is turned on by a driver in starting engine 100.

Engine ECU 200 uses the signals transmitted from each sensor and ignition switch 312 and a map and program stored in a memory 202 to perform an operation to control equipment so that engine 100 has a desired driving condition.

In the present embodiment engine ECU 200 depends on a signal transmitted from knock sensor 300 and a crank angle to detect a waveform of a vibration of engine 100 at a predetermined knock detection gate (i.e., a section from a predetermined first crank angle to a predetermined second crank angle). Hereinafter such waveform will also simply be referred to as a "vibration waveform". As will be described hereinafter, the detected vibration waveform is compared with a previously created knock waveform model to determine whether engine 100 knocks. The knock detection gate of the present embodiment is from the top dead center (0°) to 90° at the combustion stroke. It is noted that the knock detection gate is not limited thereto.

When knocking occurs inside a cylinder of engine 100, in-cylinder pressure resonates. This resonance of in-cylinder pressure causes the cylinder block of engine 100 to vibrate. Thus, the vibration of the cylinder block, that is, the frequency of the vibration detected by knock sensor 300 is often included in an in-cylinder pressure resonance frequency band.

The in-cylinder pressure resonance frequency corresponds to the resonance mode of an in-cylinder air column. The frequency bands where a vibration specific to knocking appears representatively include the first, second, third, and fourth order tangential and first order radial resonance mode frequency bands.

Figure 2:
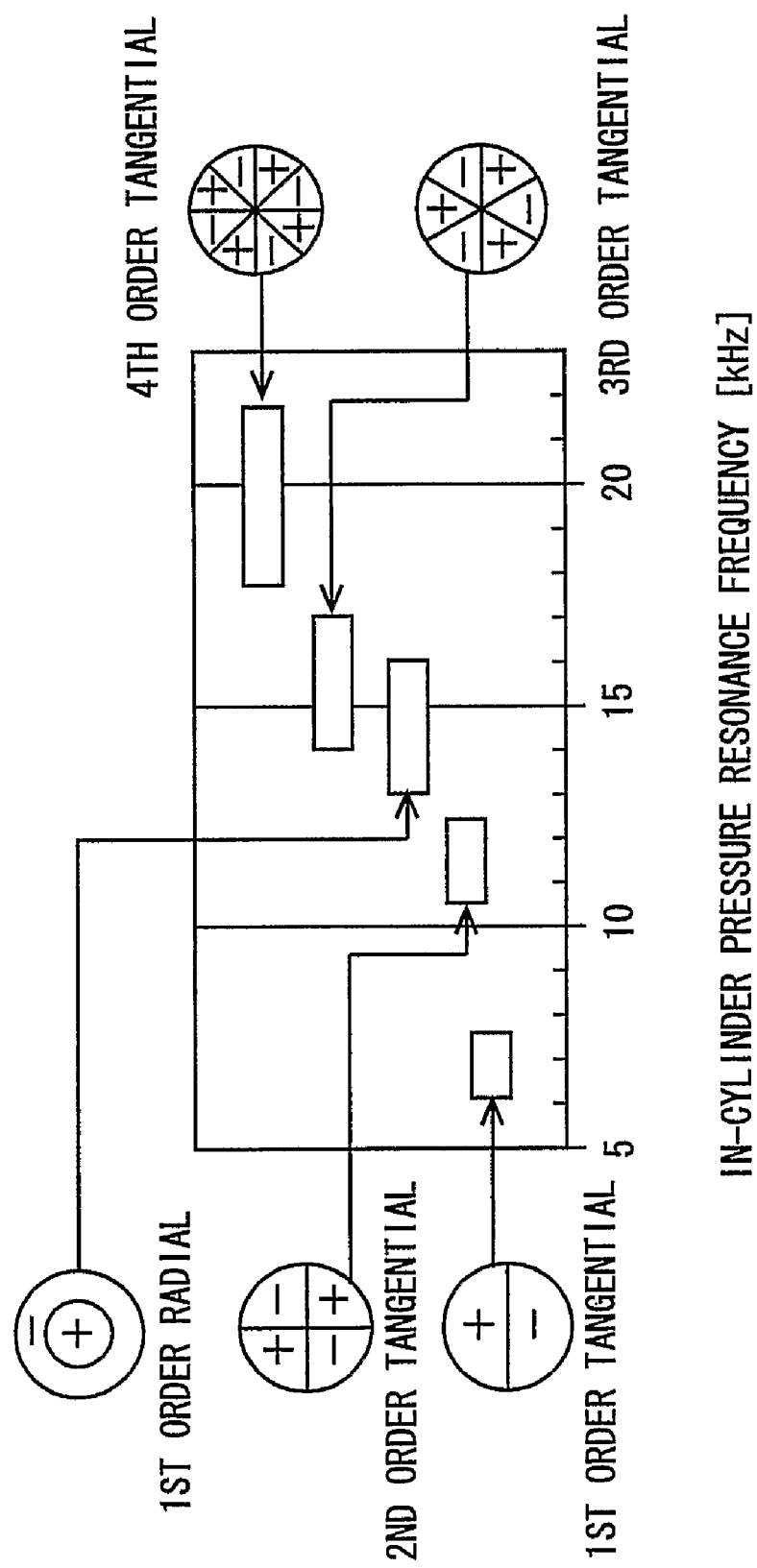
FIG. 2 shows a diagram showing a frequency band of a vibration of in-cylinder pressure.

The in-cylinder pressure resonance frequency is calculated from a resonance mode, a bore diameter and a sonic speed. FIG. 2 shows one example of the in-cylinder pressure resonance frequency for each resonance mode with a constant sonic speed and bore diameters varying from X to Y. As shown by FIG. 2, the in-cylinder pressure resonance frequency is higher in ascending order of the first order tangential, second order tangential, first order radial, third order tangential, and fourth order tangential frequency bands.

FIG. 2 shows the in-cylinder pressure resonance frequency provided when knocking occurs. After knocking occurs, the volume of the combustion chamber increases as the piston is lowered, and hence the temperature and the pressure inside the combustion chamber decrease. As a result, the sonic speed decreases, and the in-cylinder pressure resonance frequency decreases. Accordingly, as shown in FIG. 3, as the crank angle increases from ATDC (After Top Dead Center), the peak component of the frequency of the in-cylinder pressure decreases.

Due to the resonance of the in-cylinder pressure having such characteristics, the cylinder block vibrates. Therefore, in an ignition cycle where knocking has occurred, the vibrations detected by knock sensor 300 include a vibration of a frequency band A that is the same as the first order tangential resonance mode frequency band, a vibration of a frequency band B that is the same as the second order tangential resonance mode frequency band, a vibration of a frequency band C that is the same as the first order radial frequency band, a vibration of a frequency band D that is the same as the third order tangential frequency band, and a vibration of a frequency band E that is the same as the fourth order tangential resonance mode frequency band.

Figure 3:
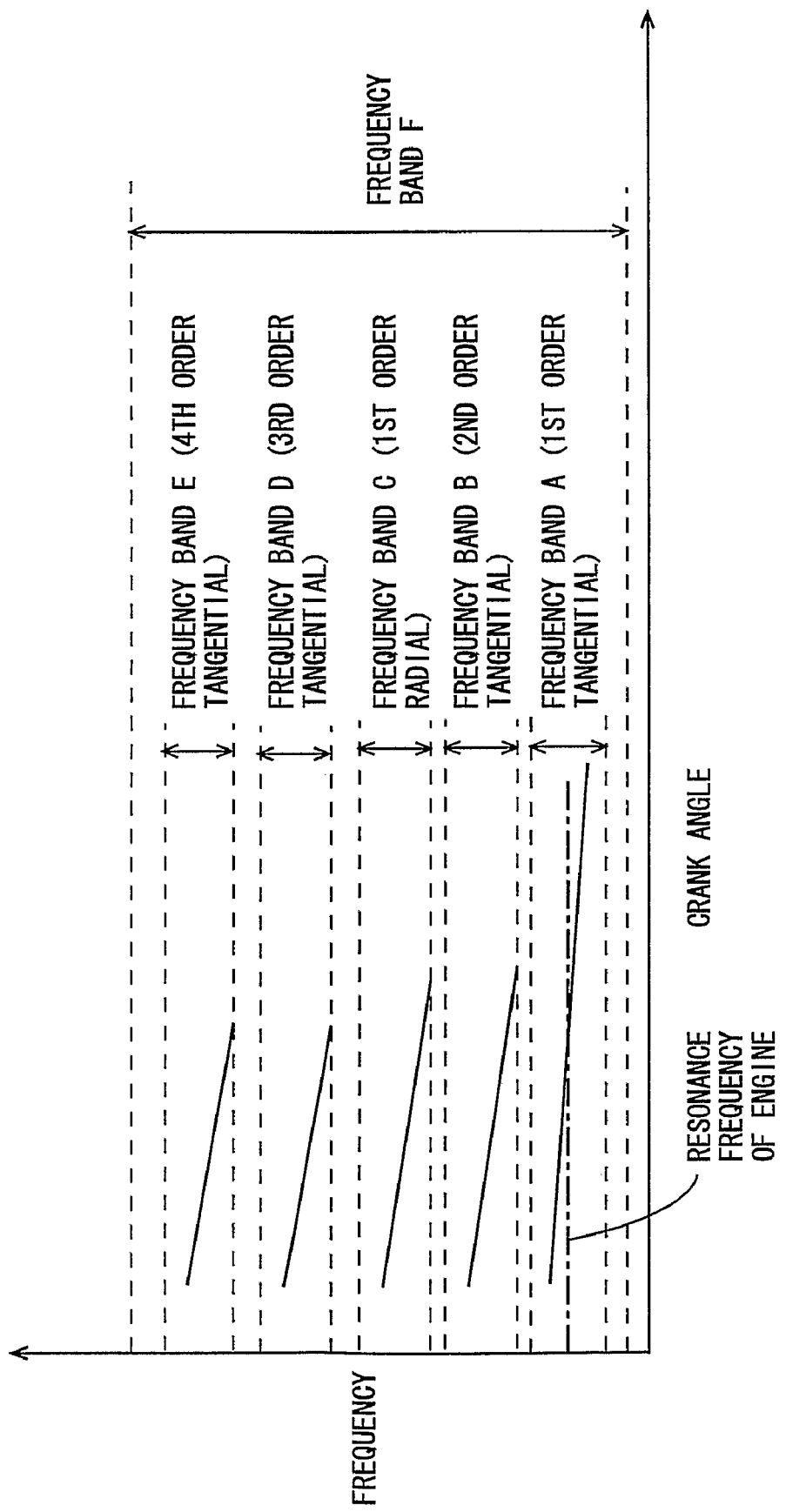
FIG. 3 is a (first) diagram showing a frequency band of a vibration detected by a knock sensor.

As shown in FIG. 3, the first order tangential resonance mode frequency band A includes the resonance frequencies of the cylinder block, piston 108, the conrod, the crankshaft, and the like, respectively.

Figure 4:
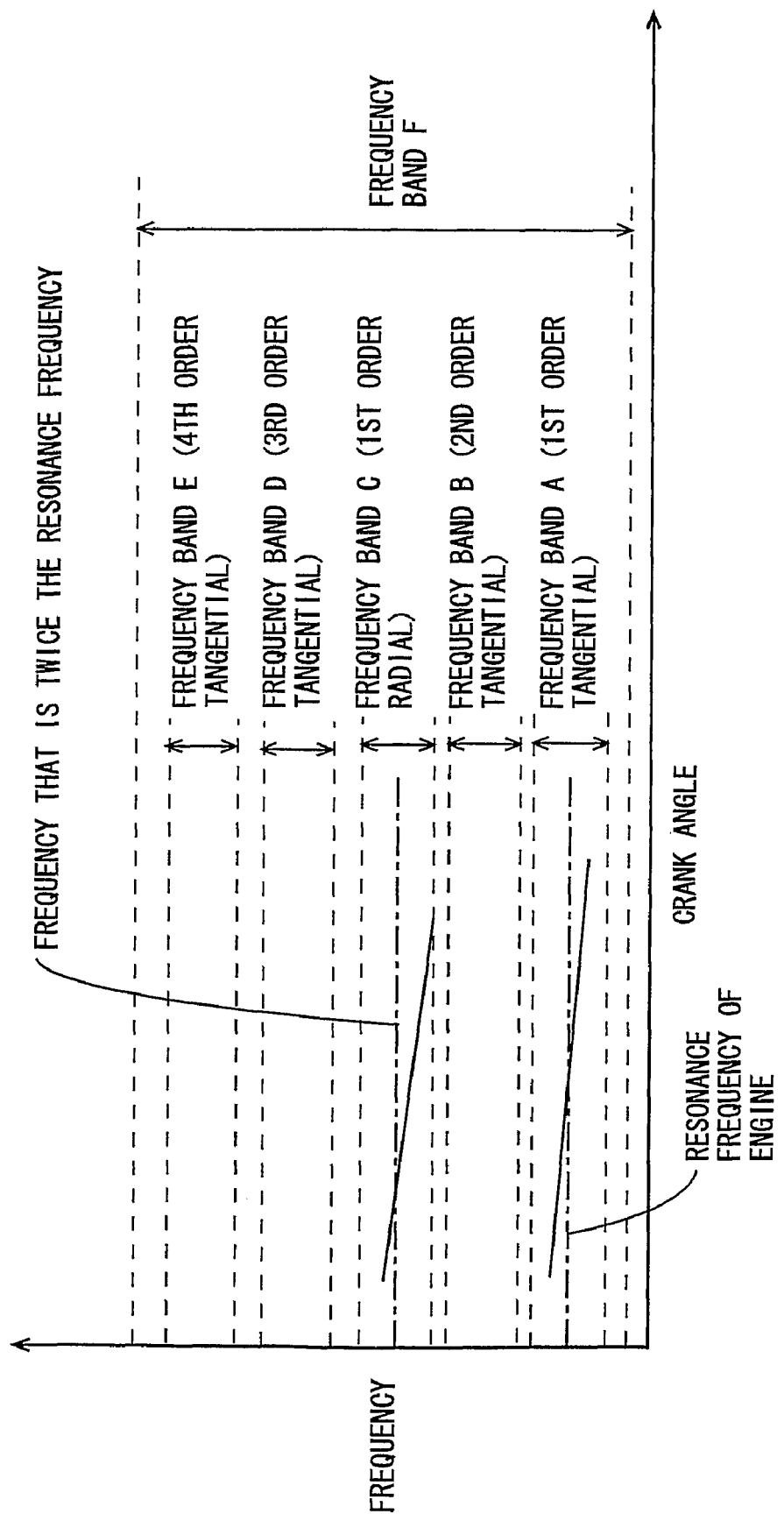
FIG. 4 is a (second) diagram showing a frequency band of a vibration detected by the knock sensor.

Thus, as shown in FIG. 4, even if knocking does not occur, there appears in frequency band A a vibration caused inevitably as injector 104, piston 108, intake valve 116, exhaust valve 118, pump 120 compressing and thus delivering fuel to injector 104, and the like operate. Furthermore, such vibration can appear in a vicinity of a frequency that is twice a resonance frequency. The vibration of the frequency that is twice the resonance frequency is included in the first order radial resonance mode frequency band C.

Accordingly, in the present embodiment, of frequency bands A-E, the vibrations of frequency bands B, D and E are extracted to remove a noise corresponding to a vibration that is not attributed to knocking. Thus a vibration unique to knocking can be extracted with precision.

When vibration is detected in a small band width, a noise component included in the magnitude of the detected vibration can be suppressed. However, the waveform of the vibration would also have the noise component's characteristic portion (such as the timing of the occurrence of the vibration, the vibration's damping rate, and the like) removed therefrom. In that case if a vibration in fact attributed to a noise component occurs, a vibration waveform excluding the noise component, i.e., a waveform analogous to a vibration waveform provided when knocking occurs, is detected. This makes it difficult to distinguish the vibration attributed to knocking and that attributed to noise.

Accordingly, in the present embodiment, when noise occurs, the noise is considered in determining whether knocking has occurred, and to do so, vibration is detected in a wide frequency band F including all of frequency bands A-E to incorporate the noise. The vibration in frequency band F is used to detect a vibration waveform of engine 100.

Figure 5:
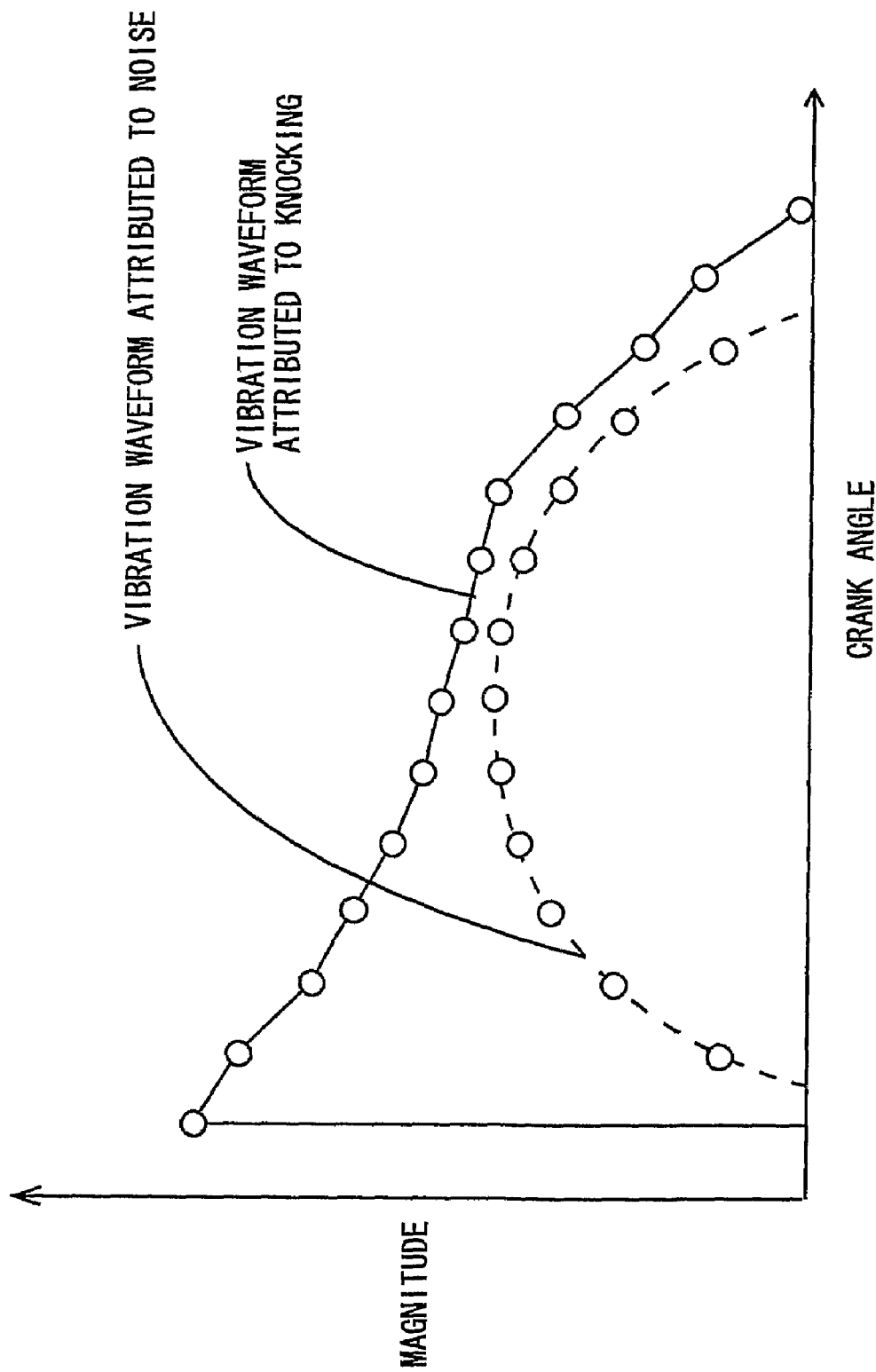
FIG. 5 shows a vibration waveform in a frequency band F.

As shown in FIG. 5, in frequency band F when a vibration waveform provided when knocking occurs has such a form that the vibration gently damps after the vibration waveform attains a peak value, as indicated by a solid line. In contrast, a vibration waveform provided when knocking does not occur and noise causes vibration is in the form of a dome as indicated by a chained line. Thus by vibration waveforms of frequency band F the vibration attributed to knocking and that attributed to noise can be distinguished from each other with precision.

Figure 6:
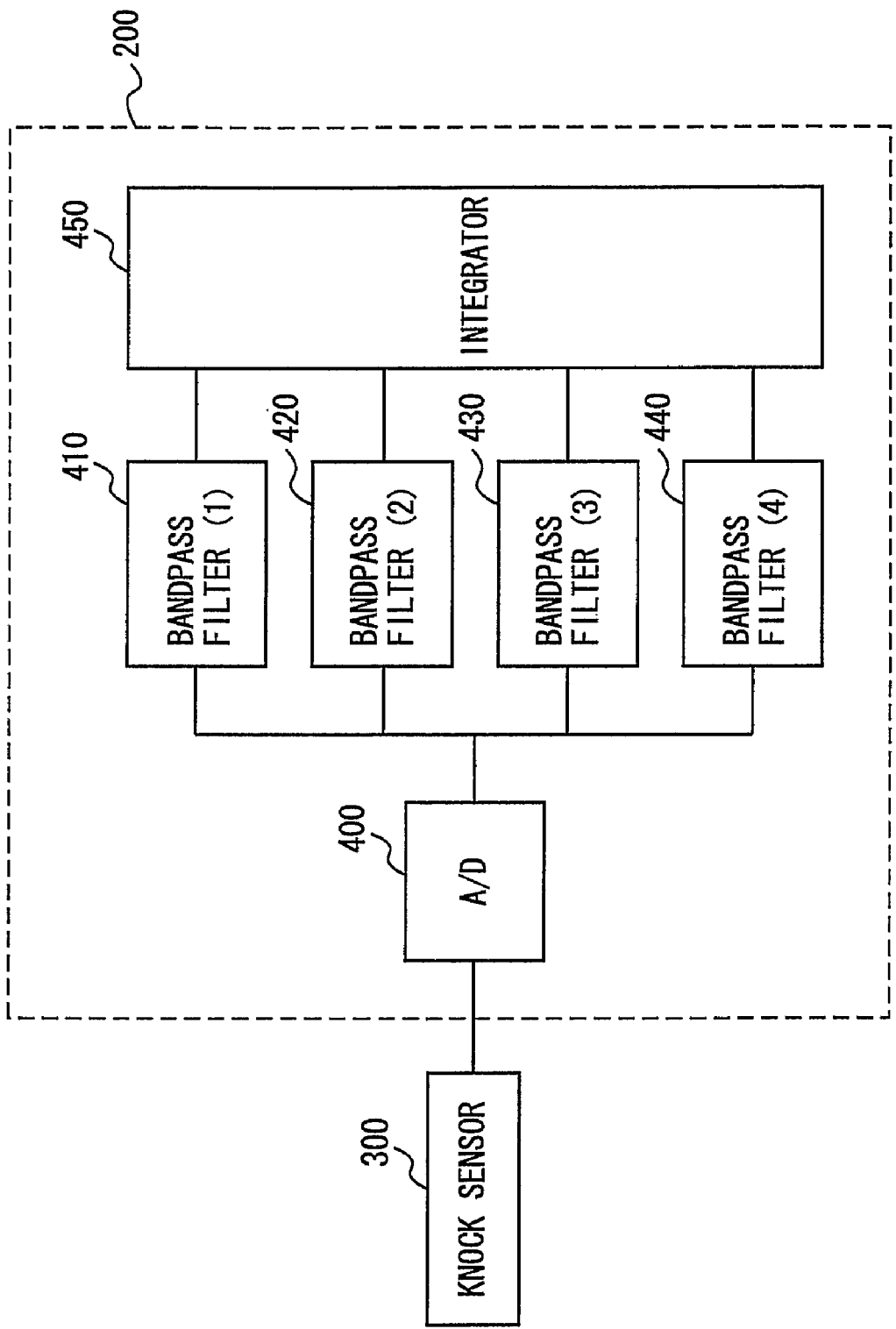
FIG. 6 is a control block diagram showing an engine ECU in FIG. 1.

Referring to FIG. 6, engine ECU 200 will further be described. Engine ECU 200 includes an analog/digital (A/D) converter 400, bandpass filters (1) 410, (2) 420, (3) 430 and (4) 440, and an integrator 450.

A/D converter 400 converts an analog signal transmitted from knock sensor 300 into a digital signal. Bandpass filter (1) 410 passes only a signal of frequency band B among the signals transmitted from knock sensor 300. That is, by bandpass filter (1) 410, only a vibration of frequency band B is extracted from the vibrations detected by knock sensor 300.

Bandpass filter (2) 420 passes only a signal of frequency band D among the signals transmitted from knock sensor 300. That is, by bandpass filter (2) 420, only a vibration of frequency band D is extracted from the vibrations detected by knock sensor 300.

Bandpass filter (3) 430 passes only a signal of frequency band E among the signals transmitted from knock sensor 300. That is, by bandpass filter (3) 430, only a vibration of frequency band E is extracted from the vibrations detected by knock sensor 300.

Bandpass filter (4) 440 passes only a signal of frequency band F among the signals transmitted from knock sensor 300. That is, by bandpass filter (4) 440, only a vibration of frequency band F is extracted from the vibrations detected by knock sensor 300.

Integrator 450 integrates the signal selected by each of bandpass filters (1) 410 to (4) 440, that is, the vibration's magnitude, for a crank angle of every five degrees. Hereinafter, the value obtained from the integration is referred to as an integrated value. The integrated value is calculated for each frequency band.

Of such calculated integrated values, those of frequency bands B, D and E are added together for each crank angle. That is, the vibration waveforms of frequency bands B, D and E are composited together. The integrated value of frequency band F is used as a vibration waveform of engine 100.

Figure 7:
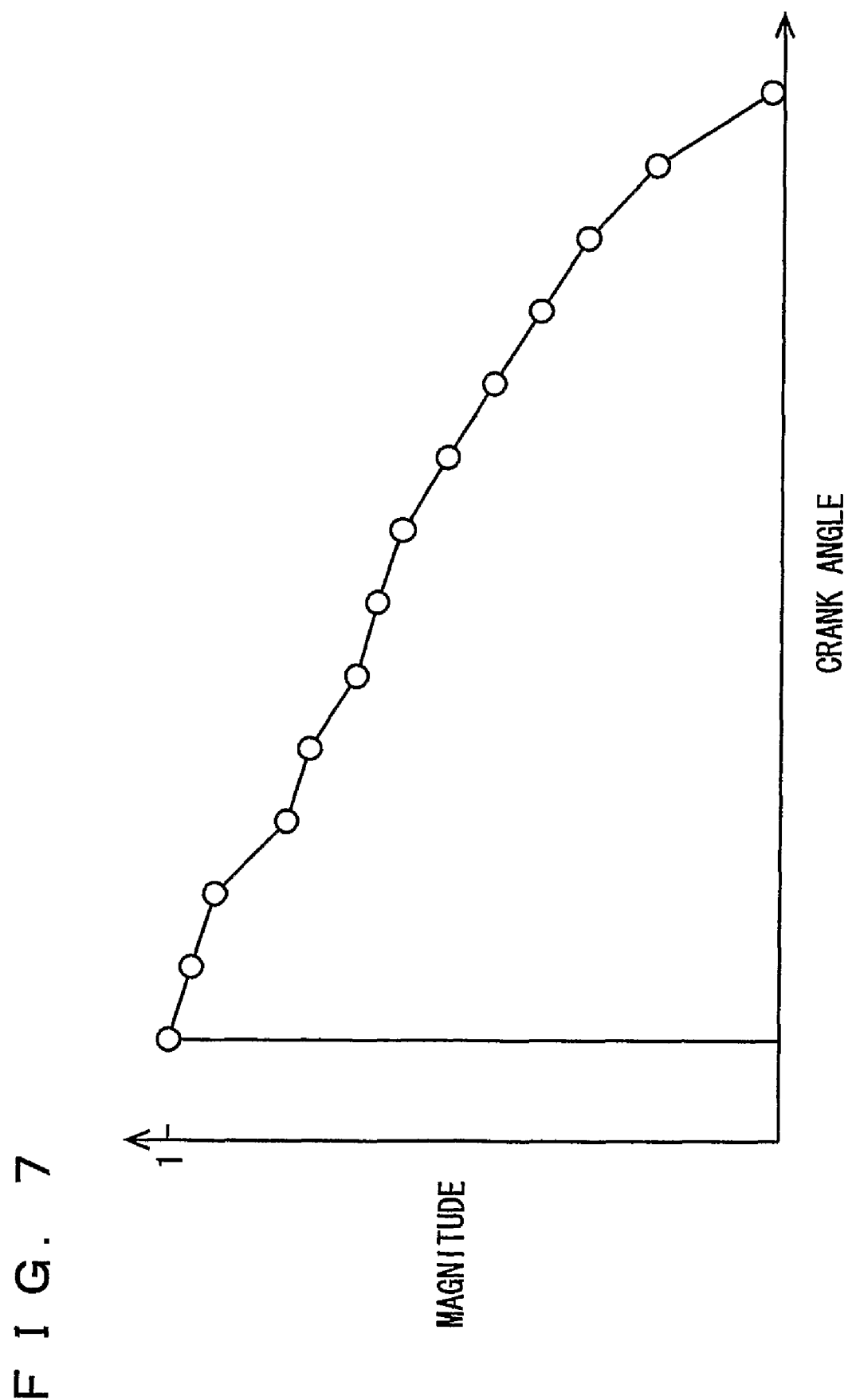
FIG. 7 is a diagram showing a knock waveform model stored in a memory of the engine ECU.

The vibration waveform of frequency band F is compared with a knock waveform model shown in FIG. 7 to determine whether engine 100 knocks. The knock waveform model is a model of a vibration waveform where engine 100 knocks. The knock waveform model is stored in memory 202 of engine 100.

In the knock waveform model, a vibration's magnitude is represented by a dimensionless number of 0 to 1 and does not uniquely correspond to a crank angle. More specifically, for the present embodiment's knock waveform model, while it is defined that vibration decreases in magnitude as the crank angle increases after a vibration's peak value in magnitude, the crank angle at which the vibration has the peak value in magnitude is not defined.

The present embodiment's knock waveform model corresponds to that portion of a vibration caused by knocking which follows the peak value in magnitude of the vibration. It should be noted that a knock waveform model corresponding to that portion of a vibration attributed to knocking which follows the rise of the vibration may be stored.

The knock waveform model is obtained as follows: an experiment or the like is conducted to force engine 100 to knock to detect the engine 100 vibration waveform, from which the knock waveform model is created and stored in advance. It should be noted, however, that the knock waveform model may be created by a different method.

Figure 8:
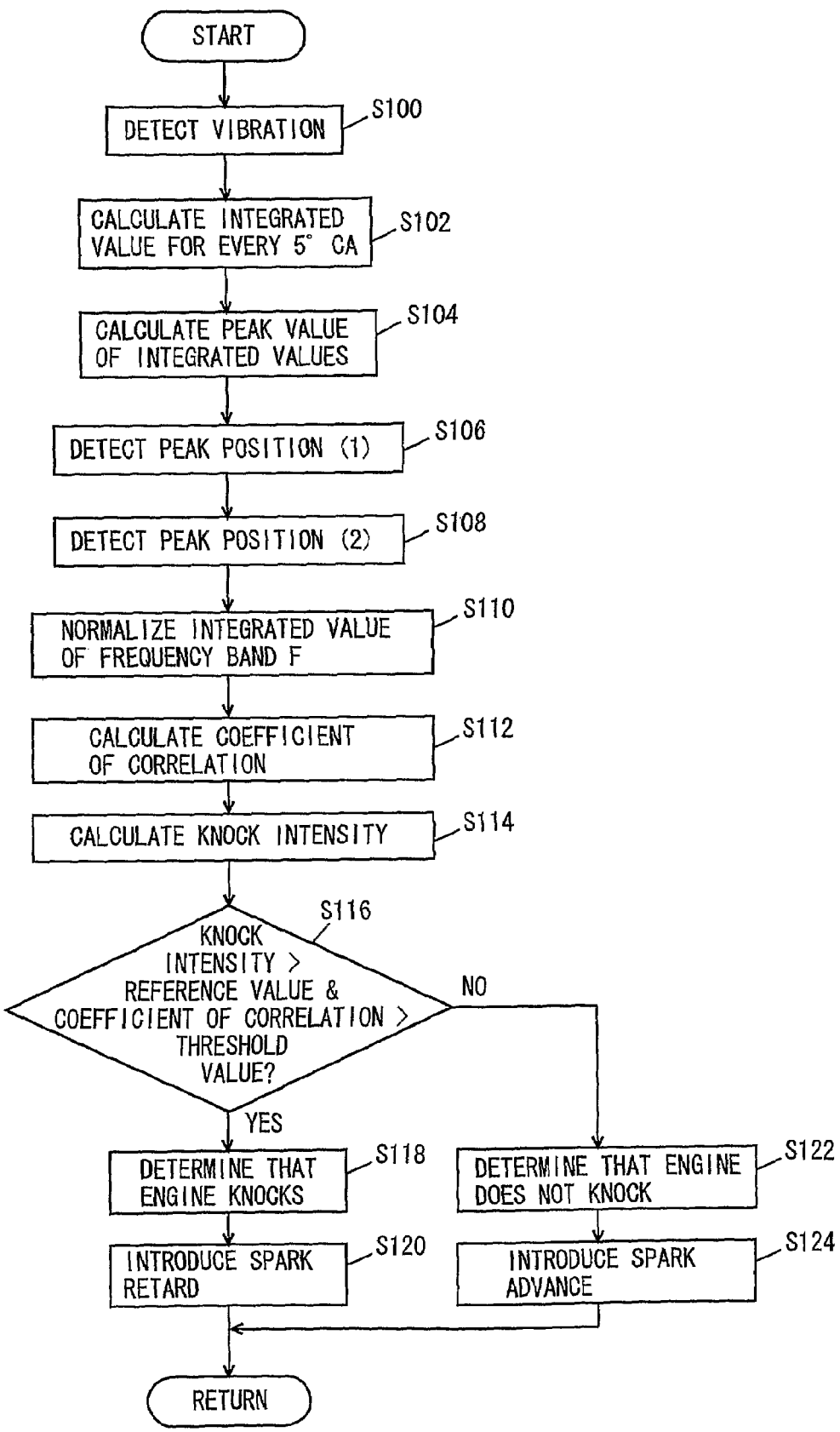
FIG. 8 is a flowchart showing a structure of a program executed by the engine ECU of FIG. 1 for control.

With reference to FIG. 8, in the present embodiment's knock determination device, engine ECU 200 executes a program having a structure for control, as will be described hereinafter.

At step (hereinafter simply referred to as "S") 100 engine ECU 200 detects the magnitude of a vibration of engine 100 from a signal transmitted from knock sensor 300. The vibration's magnitude is represented by a value of a voltage output from knock sensor 300. Note that the vibration's magnitude may be represented by a value corresponding to the value of the voltage output from knock sensor 300. The magnitude is detected at the combustion stroke for an angle from a top dead center to (a crank angle of) 90°.

At S102 engine ECU 200 calculates for a crank angle of every five degrees an integration (hereinafter also referred to as an "integrated value") of values of voltage output from knock sensor 300 (i.e., representing magnitudes of vibrations). The integrated value is calculated for each frequency band. Note that the integrated values of frequency bands B, D and E are added together for each crank angle (i.e., their waveforms are composited together). Furthermore, the integrated value of frequency band F is calculated to detect the vibration waveform of engine 100.

At S104 engine ECU 200 calculates the largest one (or a peak value) of the integrated values in the composite waveform of frequency bands B, D and E. At S106 the position of (or the crank angle corresponding to) the peak value in the composite waveform of frequency bands B, D and E is detected. Hereinafter, the position of (or the crank angle corresponding to) the peak value in the composite waveform of frequency bands B, D and E will be referred to as "peak position (1)".

At S108 engine ECU 200 detects the position of a peak value in frequency band F within a predetermined range (or crank angle) from the peak position (1). Hereinafter, the position of the peak value in frequency band F will be referred to as "peak position (2)".

In the present embodiment peak position (2) is detected in a range preceding peak position (1). For example, peak position (2) is detected among the positions of three integrated values preceding peak position (1). The position of the integrated value of frequency band F that is the largest in the range preceding peak position (1) is detected as peak position (2). Note that peak position (2) may not be detected in such range; it may be detected in a range following peak position (1).

At S110, engine ECU 200 normalizes the integrated value of frequency band F (i.e., the vibration waveform of engine 100). Herein, such normalization means dividing each integrated value by the peak value calculated at S104 to represent the vibration's magnitude by a dimensionless number (for example of 0 to 1). It is noted that the normalization is not limited to the above manner; it may be done for example by dividing each integrated value by the integrated value at peak position (2).

At S112 engine ECU 200 calculates a coefficient of correlation K, which is a value related to a deviation between the normalized vibration waveform and the knock waveform model. Peak position (2) and that position (or timing) in the knock waveform model at which vibration is maximal in magnitude are matched, while a deviation in absolute value (or an amount of offset) between the normalized vibration waveform and the knock waveform model is calculated for each crank angle (of five degrees) to calculate the coefficient of correlation K.

If the normalized vibration waveform and the knock waveform model provide a deviation in absolute value $\Delta S(I)$ for each crank angle, I being a natural number, and the knock waveform model's vibration as represented in magnitude integrated by crank angle (i.e., the knock waveform model's area) is represented by S, then the coefficient of correlation K is calculated by an equation $K=(S-\Sigma\Delta S(I))/S$, wherein $\Sigma\Delta S(I)$ represents a sum of $\Delta S(I)$s. Note that the coefficient of correlation K may be calculated by a different method.

At S114 engine ECU 200 calculates a knock intensity N. If a calculated peak value is represented by P and engine 100 does not knock and vibrates with a magnitude represented in value by a background level (BGL), then knock intensity N is calculated by an equation $N=P/BGL$. The BGL is stored in memory 202. Note that knock intensity N may be calculated by a different method.

At S116 engine ECU 200 determines whether knock intensity N is larger than a predetermined reference value and whether the coefficient of correlation K is larger than a threshold value. If so (YES at S116) the control proceeds with S118, otherwise (NO at S116) the control proceeds with S122.

At S118 engine ECU 200 determines that engine 100 knocks. At S120 engine ECU 200 introduces a spark retard. At S122 engine ECU 200 determines that engine 100 does not knock. At S124 engine ECU 200 introduces a spark advance.

An operation of engine ECU 200 of the knock determination device according to the present embodiment based on the above-described configuration and flowchart will be described.

When a driver turns on ignition switch 312 and engine 100 starts, the engine 100 vibration is detected in magnitude from a signal transmitted from knock sensor 300 (S100).

Figure 9:
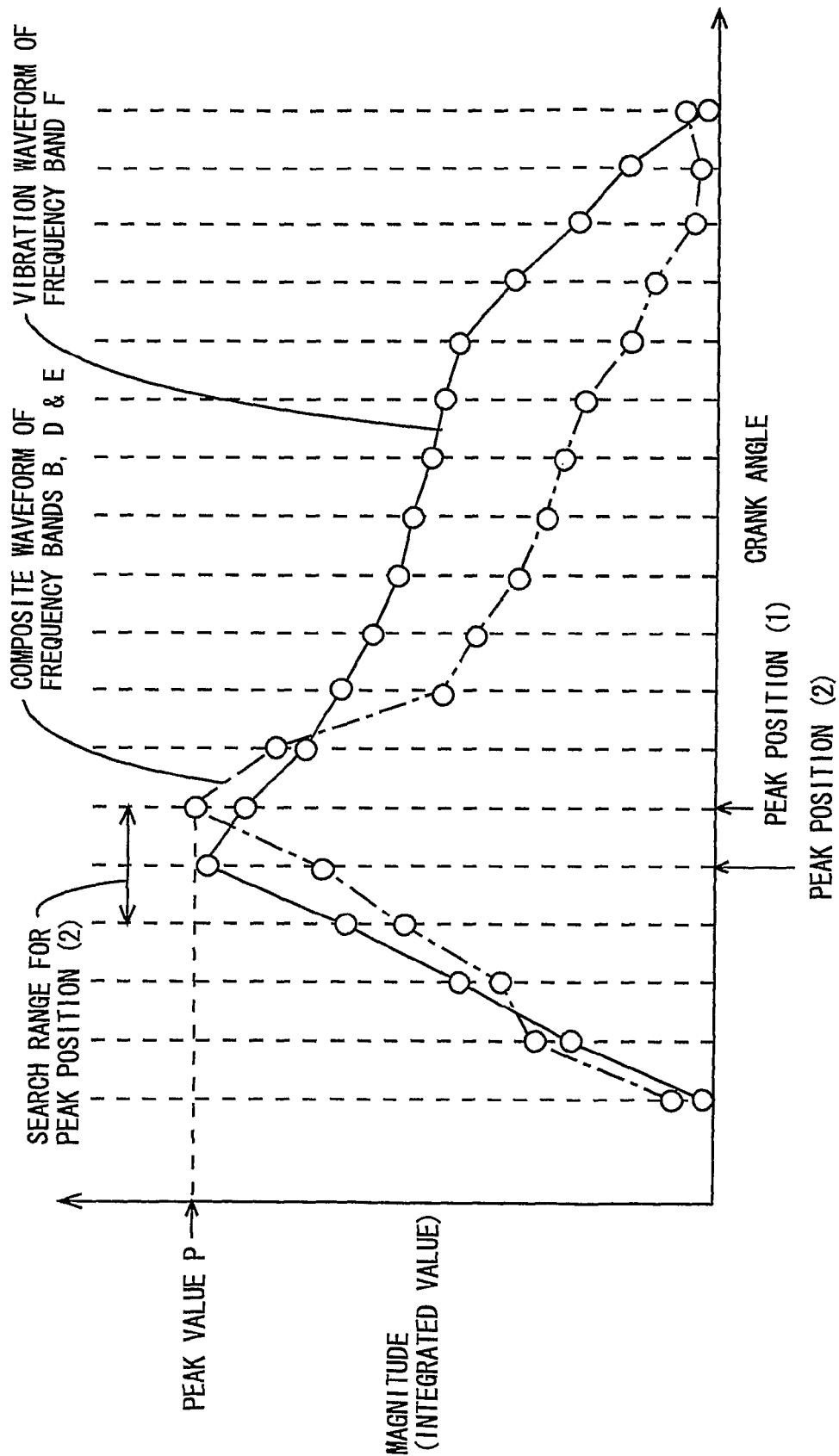
FIG. 9 is a diagram showing a vibration waveform of the engine.

At the combustion stroke for a range from the top dead center to 90° an integrated value for every five degrees is calculated for each of vibrations of frequency bands B, D, E and F, respectively. (S102). The integrated values of frequency bands B, D and E are added together for each crank angle, and as indicated in FIG. 9 by a chained line, the vibration waveforms thereof are composited together. Furthermore in FIG. 9 a solid line indicates an integrated value for frequency band F, which is used as a vibration waveform of engine 100.

As an integrated value provided for every five degrees is used to detect a vibration waveform, it becomes possible to detect a vibration waveform of which delicate variations are suppressed. This makes it easier to compare the detected vibration waveform with the knock waveform model.

The calculated integrated values are used to calculate peak value P of the integrated values in the composite waveform of frequency bands B, D and E (S104). Note that frequency bands B, D and E are frequencies excluding a resonance frequency of engine 100 and a frequency that is twice the resonance frequency of engine 100. This can reduce noise included in vibration detected and hence minimize or prevent such erroneous calculation of peak value P that is attributed to noise.

The position of peak value P, or peak position (1), is detected (S106). Herein, as shown in FIG. 9, peak position (1) is assumed to have a sixth position as counted from leftward to rightward, i.e., the position of the integrated value for 25-30 degrees).

Peak position (2) is detected from the positions of three integrated values preceding peak position (1), i.e., from the fourth to sixth integrated values as counted from leftward to rightward (S108). More specifically, of the positions of the forth to sixth integrated values as counted from leftward to rightward in frequency band F, the position of the integrated value larger than two adjacent integrated values is detected as peak position (2).

Herein, as shown in FIG. 9, the fifth integrated value as counted from leftward to rightward is larger than two adjacent integrated values, i.e., the fourth and sixth integrated values as counted from leftward to rightward. Accordingly the position of the fifth integrated value as counted from leftward to rightward will be detected as peak position (2).

Figure 10:
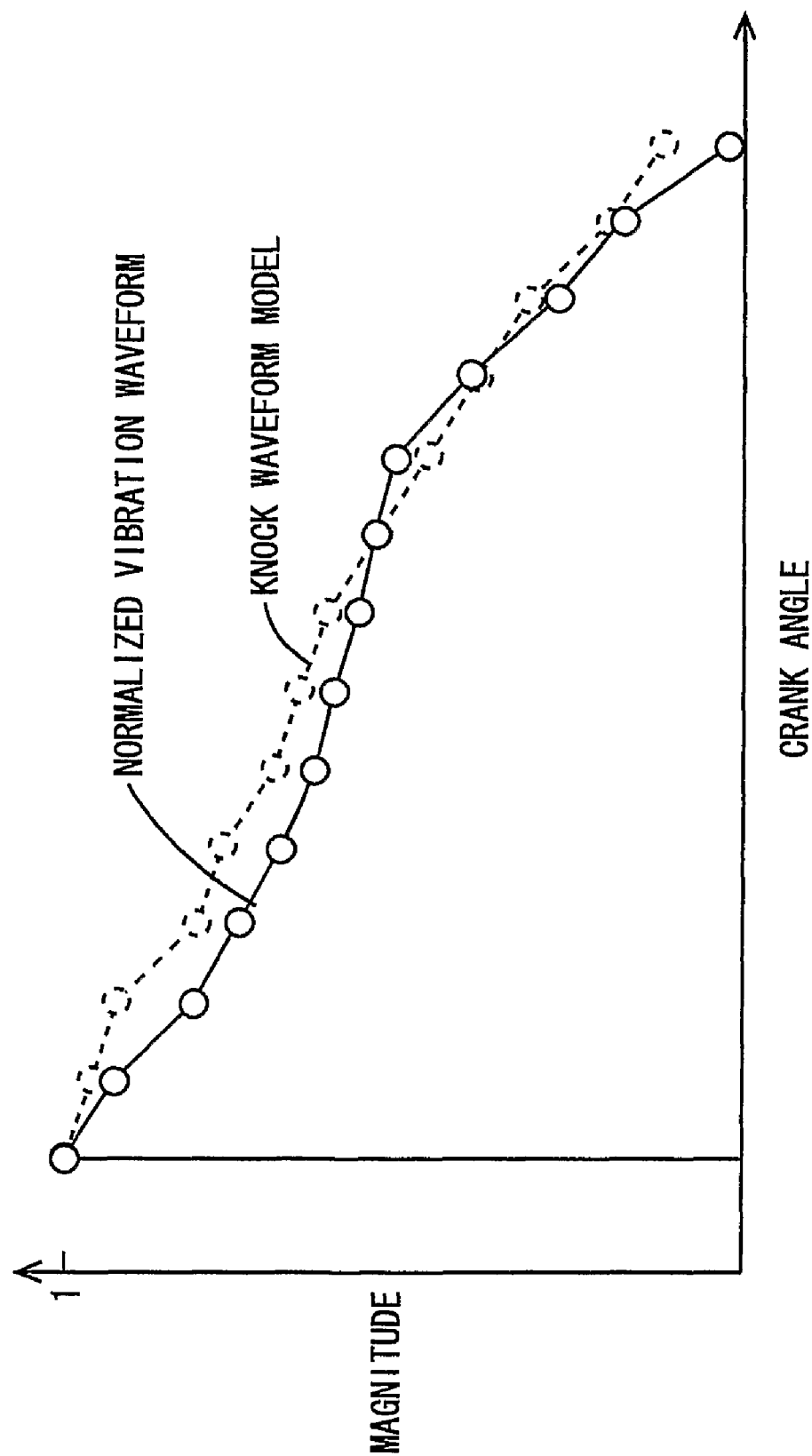
FIG. 10 is a diagram showing a comparison between a normalized vibration waveform and the knock waveform model.

The integrated value of frequency band F is divided by peak value P in the composite waveform of frequency bands B, D and E to normalize the vibration waveform, as indicated in FIG. 10 by a solid line (S110).

By the normalization, the vibration waveform is represented in vibration magnitude by a dimensionless number of 0 to 1. Thus, the detected vibration waveform can be compared with the knock waveform model regardless of the vibration's magnitude. This can eliminate the necessity of storing a large number of knock waveform models corresponding to magnitude of vibration and thus help to create a knock waveform model.

As shown in FIG. 10, a timing of a normalized vibration waveform providing a vibration maximized in magnitude, i.e., peak position (2), and that of a knock waveform model providing a vibration maximized in magnitude are matched, while a deviation in absolute value $\Delta S(I)$ between the normalized vibration waveform and the knock waveform model is calculated for each crank angle. Sum $\Sigma \Delta S(I)$ of such $\Delta S(I)$s and value S representing the magnitude of the vibration of the knock waveform as integrated by crank angle are used to calculate the coefficient of correlation $K=(S-\Sigma \Delta S(I))/S$ (S106). This allows a degree of matching of a detected vibration waveform and a knock waveform model to be numerically represented and thus objectively determined. Furthermore, comparing the vibration waveform with the knock waveform model allows the tendency of the damping of the vibration or a similar behavior of the vibration to be utilized to analyze whether the vibration is attributed to knocking.

Peak value P is divided by the BGL to calculate knock intensity N (S114). If knock intensity N is larger than a predetermined reference value and the coefficient of correlation K is larger than a threshold value (YES at S116) a decision is made that engine knocks (S118) and a spark retard is introduced (S120) to prevent the engine from knocking.

If knock intensity N is smaller than the predetermined reference value and/or the coefficient of correlation K is smaller than the threshold value (NO at S116), a decision is made that the engine does not knock (S122) and a spark advance is introduced (S124).

Thus, in the present embodiment's knock determination device, the engine ECU extracts from the vibrations detected by the knock sensor the vibrations of frequency bands B, D, E, and F including all of frequency bands A-E. The vibrations of frequency bands B, D and E, and F are each integrated in magnitude for each crank angle of five degrees. The integrated values of frequency bands B, D and E, which are of narrow bandwidth, are added together for each crank angle to composite the vibration waveforms of frequency bands B, D and E. Peak value P of the integrated values in such composite waveform is calculated. Peak value P less affected by a noise component can thus be obtained. Furthermore, the engine's vibration waveform is detected from the integrated value of frequency band F, which is of wide bandwidth. A vibration waveform can thus be obtained that includes a vibration attributed to a noise component and allows a vibration attributed to knocking and that attributed to noise to be readily distinguished. A result of comprising such vibration waveform and a knock waveform model and peak value P of the integrated values in the composite waveform of frequency bands B, D and E are used to determine whether the engine knocks. Whether a vibration has a waveform and a magnitude that are provided uniquely when the engine knocks can be determined with high precision. As a result, whether the engine knocks can be determined with high precision.

Note that while in the present embodiment three narrow bandwidth frequencies are used to detect a vibration waveform, one, two or more than three such frequencies may alternatively be used.

Furthermore, vibration may be extracted in a frequency band excluding any frequencies equal to a resonance frequency multiplied by any integers more than one.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A knock determination device for an internal combustion engine, comprising:
   a knock sensor detecting a vibration of said internal combustion engine; and an operation unit operative to extract from the detected vibration a vibration of a first frequency band including a frequency of vibration occurred by knocking and excluding a resonance frequency of said internal combustion engine, extract from the detected vibration a vibration of a second frequency band including said first frequency band and said resonance frequency of said internal combustion engine and being broader than said first frequency band, detect a waveform of a vibration at predetermined crank angle intervals, as based on said vibration of said second frequency band, store in advance a waveform serving as a reference in waveform for vibration of said internal combustion engine, and determine whether said internal combustion engine knocks, as based on a result of comparing the detected waveform with the stored waveform and an intensity of said vibration of said first frequency band.

2. The knock determination device according to claim 1, wherein:
said first frequency band is a frequency band excluding said resonance frequency and in addition a frequency corresponding to said resonance frequency that is multiplied by an integer of at least two; and
said second frequency band is a frequency band including said resonance frequency and in addition said frequency corresponding to said resonance frequency that is multiplied by said integer of at least two.

3. The knock determination device according to claim 2, wherein said integer of at least two is two.

4. The knocking determination device for an internal combustion engine according to claim 1, wherein:
said operation unit detects a first timing at which the magnitude of the vibrations of said first frequency band becomes maximum, and detects a second timing at which a magnitude of the vibrations of said second frequency band becomes maximum, based on said first timing, and determines whether knocking occurred in said internal combustion engine or not, based on a result of comparison between said detected waveform and said stored waveform, in a state where said second timing and a timing at which a magnitude of the vibrations becomes maximum in said stored waveform are matched.

5. The knocking determination device for an internal combustion engine according to claim 4, wherein:
said operation unit detects said second timing, in a range that is set based on said first timing.

6. A method of determining whether an internal combustion engine knocks, comprising:
detecting a vibration of said internal combustion engine;
extracting from the detected vibration a vibration of a first frequency band including a frequency of vibration occurred by knocking and excluding a resonance frequency of said internal combustion engine;
extracting from the detected vibration a vibration of a second frequency band including said first frequency band and said resonance frequency of said internal combustion engine and being broader than said first frequency band;
detecting a waveform of a vibration at predetermined crank angle intervals, as based on said vibration of said second frequency band;
storing in advance a waveform serving as a reference in waveform for vibration of said internal combustion engine; and
determining whether said internal combustion engine knocks, as based on a result of comparing the detected waveform with the stored waveform and an intensity of said vibration of said first frequency band.

7. The method of determining whether an internal combustion engine knocks according to claim 6, wherein:
said first frequency band is a frequency band excluding said resonance frequency and in addition a frequency corresponding to said resonance frequency that is multiplied by an integer of at least two; and
said second frequency band is a frequency band including said resonance frequency and in addition said frequency corresponding to said resonance frequency that is multiplied by said integer of at least two.

8. The method of determining whether an internal combustion engine knocks according to claim 7, wherein said integer of at least two is two.

9. The method of determining whether an internal combustion engine knocks according to claim 6, further comprising:
detecting a first timing at which the magnitude of the vibrations of said first frequency band becomes maximum; and
detecting a second timing at which a magnitude of the vibrations of said second frequency band becomes maximum, based on said first timing, wherein:
said determining whether said internal combustion engine knocks includes determining whether knocking occurred in said internal combustion engine or not, based on a result of comparison between said detected waveform and said stored waveform, in a state where said second timing and a timing at which a magnitude of the vibrations becomes maximum in said stored waveforms are matched.

10. The method of determining whether an internal combustion engine knocks according to claim 9, wherein:
said detecting said second timing includes detecting said second timing, in a range that is set based on said first timing.

11. A knock determination device for an internal combustion engine, comprising:
means for detecting a vibration of said internal combustion engine;
first extraction means for extracting from the detected vibration a vibration of a first frequency band including a frequency of vibration occurred by knocking and excluding a resonance frequency of said internal combustion engine;
second extraction means for extracting from the detected vibration a vibration of a second frequency band including said first frequency band and said resonance frequency of said internal combustion engine and being broader than said first frequency band;
means for detecting a waveform of a vibration at predetermined crank angle intervals, as based on said vibration extracted by said second extraction means;
means for storing in advance a waveform serving as a reference in waveform for vibration of said internal combustion engine; and
means for determining whether said internal combustion engine knocks, as based on a result of comparing the detected waveform with the stored waveform and an intensity of said vibration extracted by said first extraction means.

12. The knock determination device according to claim 11, wherein:
said first frequency band is a frequency band excluding said resonance frequency and in addition a frequency corresponding to said resonance frequency that is multiplied by an integer of at least two; and said second frequency band is a frequency band including said resonance frequency and in addition said frequency corresponding to said resonance frequency that is multiplied by said integer of at least two.

13. The knock determination device according to claim 12, wherein said integer of at least two is two.

14. The knocking determination device for an internal combustion engine according to claim 11, further comprising:
   first detecting means for detecting a first timing at which the magnitude of the vibrations extracted by said first extracting means becomes maximum; and
   second detecting means for detecting a second timing at which a magnitude of the vibrations extracted by said second extracting means becomes maximum, based on said first timing, wherein:
   determining means includes means for determining whether knocking occurred in said internal combustion engine or not, based on a result of comparison between said detected waveform and said stored waveform, in a state where said second timing and a timing at which a magnitude of the vibrations becomes maximum in said stored waveform are matched.

15. The knocking determination device for an internal combustion engine according to claim 14, wherein:
   said second detecting means includes means for detecting said second timing, in a range that is set based on said first timing.

* * * * *